(No Model.)
W. O. SAVAGE.
LIQUID COOLER.
No. 522,721. Patented July 10, 1894.
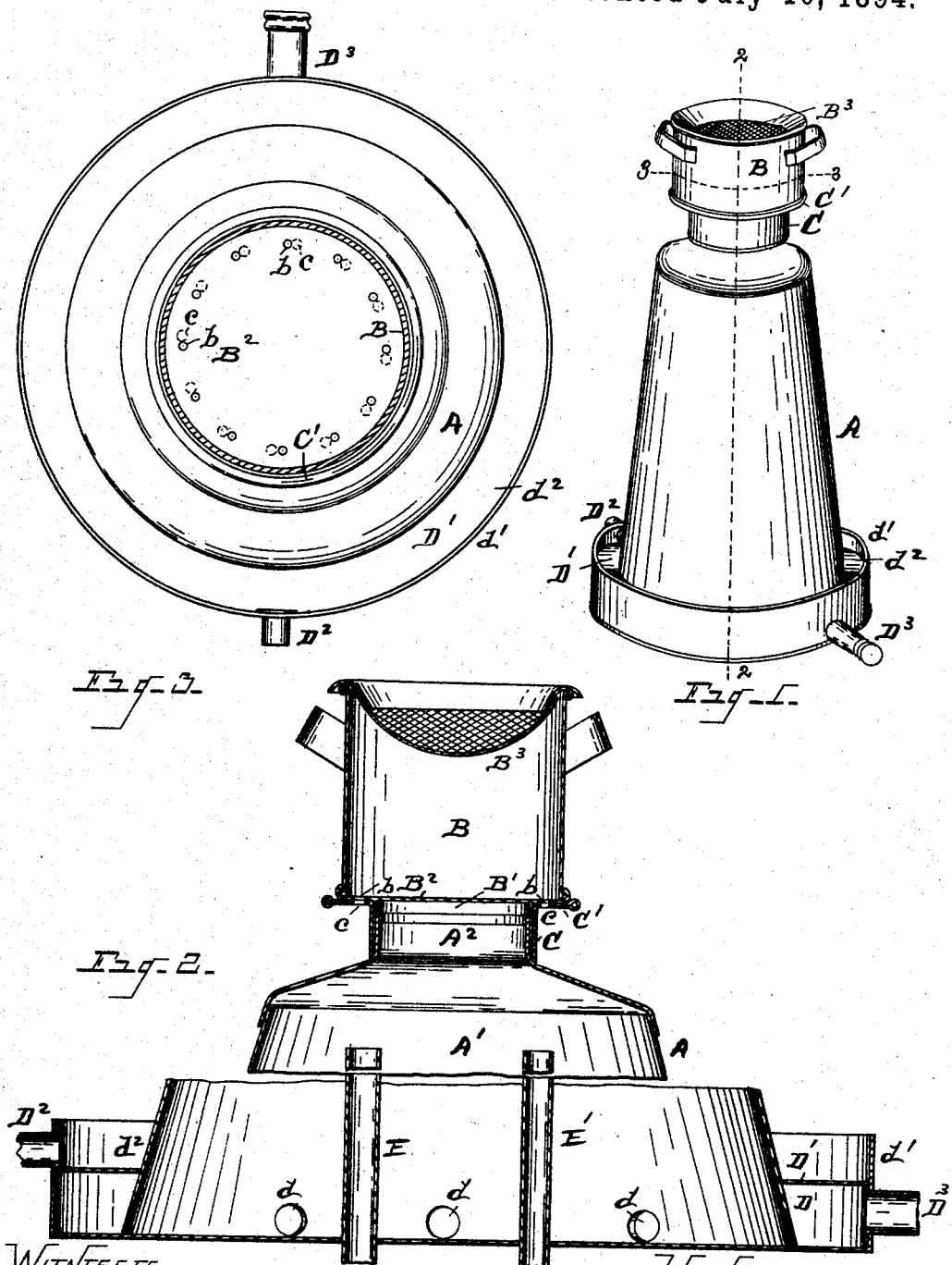
WITNESSES
O. B. Barnziger
John F. Miller
INVENTOR
William O. Savage
By Newell S. Wright
His Attorney.

UNITED STATES PATENT OFFICE.

WILLIAM O. SAVAGE, OF BELLEVILLE, MICHIGAN, ASSIGNOR OF TWO-THIRDS TO CHARLES DITSCH AND JAMES A. CADY, OF SAME PLACE.

LIQUID-COOLER.

SPECIFICATION forming part of Letters Patent No. 522,721, dated July 10, 1894.

Application filed July 14, 1893. Serial No. 480,474. (No model.)

*To all whom it may concern:*

Be it known that I, WILLIAM O. SAVAGE, a citizen of the United States, residing at Belleville, county of Wayne, State of Michigan, have invented a certain new and useful Improvement in Liquid-Coolers; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a liquid cooler, the same being more particularly intended and designed for a milk cooler, although it may be used for other purposes, and I would have it understood that I do not limit the use of my invention alone to a milk cooler.

My object is to provide a cooler whereby the milk or other liquid will be caused to pass in a thin stream over a cooled surface exposed to the atmosphere where the milk or other liquid will be aerated as well as cooled in the one operation. The importance of aerating milk, for example, and of cooling it preparatory to its being set away is well understood, the aeration improving the flavor and eliminating from the milk certain products, and thereby greatly purifying it.

My invention, to these ends, consists of the construction, combination and arrangement of devices and appliances hereinafter specified and claimed and illustrated in the accompanying drawings, in which—

Figure 1 is a view in perspective embodying my invention. Fig. 2 is a vertical section of the same, showing parts broken away, the section being on the line 2—2 Fig. 1. Fig. 3 is a horizontal section on the line 3—3 Fig. 1.

I carry out my invention as follows:

In the drawings A represents a case, preferably tapering upward, and forming an interior chamber A'.

$A^2$ is the neck of the cooler case.

B denotes a strainer can or cup constructed with a depending flange B' to set over the neck $A^2$ of the cooler, and provided with a bottom $B^2$ perforated at its periphery as shown at $b$, outside of the flange B', the bottom being solid over the top of the neck $A^2$, as shown.

$B^3$ is a strainer located over the top of the can or cup B, and preferably removable therefrom. The can or cup B has a removable engagement with the neck of the cooler-case, and when removed said neck is open, permitting access into the chamber A'. To regulate the discharge of the milk or other liquid through the base of the strainer can, I prefer also to provide an annular collar C having a horizontal flange C' sitting up snugly under the perforated portion of the bottom $B^2$, said flange also being perforated as shown at $c$, the perforations being shown in dotted lines in Fig. 3. The collar C sits snugly outside the flange B' of the strainer can.

By turning the collar C and its perforated flange, as required, the base $B^2$ may readily be closed or opened, by making the perforations in the base and flange register or otherwise. So also the size of the openings through the base $B^2$ may be regulated to control the amount of liquid permitted to pass therethrough as may be desired.

At the base of the cooler case A I provide a laterally extended cooling chamber D communicating with the chamber A', as through orifices $d$. The case of the chamber D and the case A of the receiving chamber A' have a water tight connection one with the other, to make the interior receiving chamber water tight at its base to contain the cooling substance, and is closed at its top by a plate D' provided with an upwardly extended flange $d'$, forming an annular trough $d^2$, from which leads a discharge pipe $D^2$. The chamber D is provided with a discharge pipe $D^3$.

The cooler as so constructed is adapted for the insertion of ice into the chamber A', by removing the strainer can B. As the ice melts the water will flow into the chamber D.

I do not however limit myself to the use of ice in my improved cooler, only, as provision may be made to fill the chamber A' with cold water, as by means of an inlet pipe E which may be connected with any desired source of water supply.

E' is an overflow pipe projecting into the chamber A' to any desired height.

The operation of the cooler will now be understood. The chamber A' being filled with ice or water the milk or other liquid is poured into the can B from which it passes through the perforations $b$ over the outside of the case A in a thin sheet, in contact with the cooling surface of the case and exposed to the atmosphere. The milk or other liquid descends over the surface of the case A into the trough $d^2$ over the cooling chamber D from which it is drawn off, cooled and aerated, through the pipe $D^2$. The apparatus is convenient, portable, and of superior efficiency. The can B and collar C with the strainer $B^3$ being all removable, the whole apparatus may be readily and thoroughly cleansed.

What I claim as my invention is—

1. A liquid cooler having in combination a case A forming an interior, hollow receiving chamber $A'$ to receive the cooling substance, a can B removably engaged with the upper end of said case and provided with a base perforated to discharge the liquid over the outer surface of the case, an auxiliary cooling chamber D extending laterally from the base of the interior chamber $A'$ and communicating therewith, whereby the chamber $A'$ and the auxiliary cooling chamber D, may be simultaneously cooled by the cooling substance, and a trough above the auxiliary chamber to receive the liquid discharged over the outer surface of the case A, the lower edge of the case A having a water tight connection with the case of the auxiliary cooling chamber, substantially as set forth.

2. A liquid cooler having in combination a case A, forming an interior, hollow receiving chamber $A'$, inlet and overflow pipes projecting upward within the interior chamber and communicating therewith, a can B removably engaged with the upper end of the case A and provided with a perforated base to discharge the liquid over the outer surface of said case, an auxiliary cooling chamber extending laterally from the base of the chamber $A'$ and communicating therewith, whereby the interior chamber $A'$ and the auxiliary chamber D may be simultaneously cooled by the cooling substance, and a trough above said auxiliary chamber, the lower edge of the case A having a water tight connection with the case of the auxiliary chamber, substantially as described.

3. A liquid cooler having in combination a cooling chamber $A'$, a cooling chamber D extending laterally from the base thereof and communicating therewith, a trough above the chamber D to receive the liquid to be cooled, a can B removably engaged with the upper end of the case of the chamber $A'$ and provided with a perforated base, and a rotatable collar C and perforated flange $C'$ located beneath said base, whereby the amount of liquid discharged from the said can may be regulated, substantially as set forth.

In testimony whereof I sign this specification in the presence of two witnesses.

WILLIAM O. SAVAGE.

Witnesses:
N. S. WRIGHT,
O. B. BARNZIGER.